United States Patent [19]

Essenwanger

[11] Patent Number: 4,951,237
[45] Date of Patent: Aug. 21, 1990

[54] DIRECT DIGITAL SYNTHESIZER WITH SELECTABLY RANDOMIZED ACCUMULATOR

[75] Inventor: Kenneth A. Essenwanger, Walnut, Calif.

[73] Assignee: Hughes Aircraft Company, Los Angeles, Calif.

[21] Appl. No.: 184,642

[22] Filed: Apr. 22, 1988

[51] Int. Cl.$^5$ ............................................ H03K 13/32
[52] U.S. Cl. ...................................... 364/721; 328/14
[58] Field of Search ................... 364/721, 701; 328/14

[56] References Cited

U.S. PATENT DOCUMENTS

| | | | |
|---|---|---|---|
| 4,410,954 | 10/1983 | Wheatley, III | 364/701 |
| 4,752,902 | 6/1988 | Goldberg | 364/721 |
| 4,809,205 | 2/1989 | Freeman | 364/721 |
| 4,815,018 | 3/1989 | Reinhardt et al. | 364/701 |

Primary Examiner—David H. Malzahn
Attorney, Agent, or Firm—Wanda K. Denson-Low

[57] ABSTRACT

A direct digital synthesizer (DDS) accumulator circuit is disclosed wherein a selected few of the low order accumulator bits are dithered by a pseudorandom number generator in order to introduce flat frequency deviation density to suppress spurious signals including those close-in to the output or fundamental frequency. The accumulator circuit may advantageously be sectioned into a lower order accumulator and higher order accumulator in a pipelined combination with a sine approximation output circuit in order to construct a DDS circuit wherein such spur suppression is achieved without decreasing system throughput.

21 Claims, 4 Drawing Sheets

DIRECT DIGITAL SYNTHESIZER WITH SELECTABLY RANDOMIZED ACCUMULATOR

This invention was made with Government support under Contract No. F19628-85-C-0163. The Government has certain rights in this invention.

BACKGROUND OF THE INVENTION

1. Field of the Invention

The invention relates generally to digital frequency synthesizer apparatus, and more particularly to such apparatus employing an accumulator for synthesizing a selected frequency of a number of preselected frequencies in conjunction with a randomizer which adds random or pseudorandom values to a selectable few of the least significant bits of the accumulator.

2. Description of Related Art

In the design of radio communications systems, a continuing goal has been the design of a simple, low-cost frequency synthesizer that can provide a large library of discrete frequencies over a very wide frequency spectrum. Design efforts toward this goal have introduced an associated spectrum of spurious outputs, the minimization of which has not been entirely successful or satisfactory.

Prior art approaches have typically been too complex for commercial feasibility. Most such prior-art solutions employ digital logic and have required the use of hybrid devices such as digital-to-analog (D/A) converters, as well as table look-up devices such as sine/cosine Read Only Memories (ROM's). A primary purpose of these additional elements has been to reduce the poor output spectral quality. Such associated poor output spectral quality is mainly evidenced by the presence of a large number of unwanted or spurious line spectral components referred to commonly as "spurs."

Direct Digital Frequency Synthesis is a digital technique of frequency synthesis that is often used in phase and frequency modulation and frequency hopping schemes in spread spectrum communications. This technique is advantageous because of the speed at which frequency can be changed, the small frequency step size possible, and the digital control of phase or frequency available. An apparatus employing this technique is referred to as a Direct Digital Synthesizer or "DDS."

The output frequency of a DDS is determined by an input digital frequency control word. This frequency control word can be generated by a digital processor. Many modulation schemes can be implemented, for example, FSK, FM, PM, DPSK, etc. Thus, for example, the output frequency can be frequency modulated according to the information digitized by the processor (FSK modulation). In addition to the FSK modulation, the window of modulated frequencies can hop, thereby moving the window of modulated frequencies in a coded scheme to avoid jamming or decoding by unauthorized transceivers. It is the agility and the frequency resolution of the DDS that makes it superior to other synthesizers in such an application and gives an unauthorized transceiver less time to lock on the correct frequency and then jam or decode it. Naturally, the authorized receiver must hop to the correct frequency to receive the modulated information. The receiver's digital processor generates the correct digital control word for the receiver's DDS and subsequent down-conversion, demodulation, and decoding.

The heart of the Direct Digital Synthesizer is the accumulator. The accumulator is a digital integrator consisting of a latch and full adder with the output sum and the input digital control word as inputs to the adder. The frequency word determines the step size by which the accumulated sum is incremented. Each step represents a step or increment in phase; thus, larger frequency words result in larger steps in phase. In addition, the rate of overflow of the accumulator determines the output frequency. The output frequency is a fraction of the clock frequency; thus its spurious performance has similarities to a fractional divider. However, some frequencies are not submultiples of the clock frequency, and the accumulator overflow occurs with varying remainders left in the accumulator. The residue left in the accumulator varies the output periods such that a sequence of different output periods result. The average of this sequence of periods is the desired period and, thus, determines the output frequency. However, since this sequence of periods is also different from an ideal repetition of the exact period, spurious line frequencies or "spurs" unique to each output frequency are created. Such spurs represent departure of the output waveform from a precisely periodic signal.

If the overflow of the accumulator is used to generate a binary output, the spurious levels will be significant. The conventional method used to suppress these spurious frequencies utilizes a sine approximation technique. This technique essentially consists of the accumulator, a sine look-up table in Read Only Memory (ROM), a digital analog converter (DAC), and an output filter. The instantaneous error from an ideal sinusoidal frequency of constant period is reduced; therefore, the spurious levels are suppressed.

An alternative to such solutions is disclosed in Wheatley, U.S. Pat. No. 4,410,954. That patent discloses an apparatus for feeding a value corresponding to a selected phase increment at a clock rate to an adder, which is in mutual cooperation with an accumulator. The resultant periodic overflow of the accumulator corresponds to the selected frequency of interest. Additional cooperating apparatus is provided for generating a random sequence of values. The difference between any one of these values and the selected phase increment is less than the selected phase increment. Jitter logic is responsive to the overflow output of the accumulator to add or subtract a sequential one of the random values to or from the phase increment value as an input to the accumulator for at least one clock interval occurring within the duration between successive overflows of the accumulator. The Wheatley dithered DDS has a binary output; therefore, it has the advantage that no ROM or DAC is needed.

The Wheatley method randomly varies or dithers the accumulator at each overflow or alternate overflows such that the edges or just one edge of the binary output are dithered. The Wheatley circuit thus reduces spurs by summing a random value with a uniform distribution up to the selected phase increment or "input vector." However, the Wheatley operation introduces flat phase noise, although, in many applications, the introduced flat phase noise is within the phase noise performance margin and hence does not limit system performance, whereas the spurious performance attributable to spurs in the absence of spur reduction would limit system performance.

One disadvantage of the Wheatley circuit is that the frequency deviation density decreases with decreasing frequency offset. Hence, the deviation density is inadequate to reduce close-in spurs, i.e., those spurs near the desired frequency output.

A second disadvantage of the Wheatley circuit is the lack of flexibility in selecting between the amount of spur reduction and phase noise. Since the dither is uniform up to the input vector, a trade-off between spur reduction and phase noise is established. With Wheatley's circuit, selectability between these two performance criteria can be achieved only through selection of the clock rate, a relatively inflexible approach.

SUMMARY OF THE INVENTION

It is therefore an object of the invention to improve direct digital synthesizer (DDS) circuitry.

It is another object of the invention to improve DDS circuits employing an accumulator as a frequency generator.

It is yet another object of the invention to provide a DDS employing an accumulator frequency generator in which close-in spurs are effectively reduced.

According to the invention, an accumulator applicable in a DDS is employed in conjunction with a randomizer that adds random or pseudorandom values to a selectable few of the least significant bits of the accumulator to introduce flat or nearly flat frequency deviation density in the vicinity of significant spurs for spurious frequency suppression, instead of dithering enough bits of the accumulator to introduce flat phase noise as in prior art. The frequency deviation density at the spur's offset in frequency from the carrier effectively spreads the energy of the spur; therefore, by this technique all in-band spurs are equally reduced.

The invention particularly departs significantly from the approach taught by Wheatley. The random value is uniformly distributed over a range which is not up to and just less than the input vector as taught by Wheatley, but is rather much less than the input vector for a given set of system specifications. In addition, the random value added to the accumulator is not necessarily subtracted out and can be allowed to circulate in the accumulator. Permitting the random value to circulate in the accumulator results in a known offset in output frequency. This offset can be subtracted from the input digital frequency control word (input vector) in applications where it proves objectionable. An additional advantage is that, if the bits dithered are below the lowest input vector for a given output bandwidth, the dithering no longer needs to be sensitive to the input vector. This significantly reduces the complexity of the hardware since the comparator and memory (stack) in the prior art Wheatley circuit are no longer required. Additionally, in a sine DDS design, if the significance of the low bits are truncated in the sine approximation algorithm, the accumulator can be sectioned into additional pipelined stages, and the dither can be implemented without decreasing throughput. In fact, the accumulator can be lengthened while maintaining the same number of LSB's dithered. As a result, the spurs are spread into as low a level as before, but the phase noise introduced by dithering is reduced.

For a direct digital synthesizer employing the invention, the levels of all in-band sampling spurs are reduced, including the spurs close-in to the fundamental, which the prior art is ineffective in reducing. The dither introduces a frequency deviation of the signal which is less than the frequency offset of the closest spur to the fundamental. Consequently, the frequency deviation density at the offset frequencies of the spurs is constant, and all in-band spurs are reduced by the same amount including the close-in spurs.

In addition, since the number of bits dithered is selectable and the accumulator can be any length, a wide range of spur levels and phase noise trade-offs are possible. The number of bits dithered may be selected by hardwiring or by processor or other digital control.

BRIEF DESCRIPTION OF THE DRAWINGS

The just-summarized invention will now be described in conjunction with the drawings of which.

DESCRIPTION OF THE PREFERRED EMBODIMENTS

Figure 1:
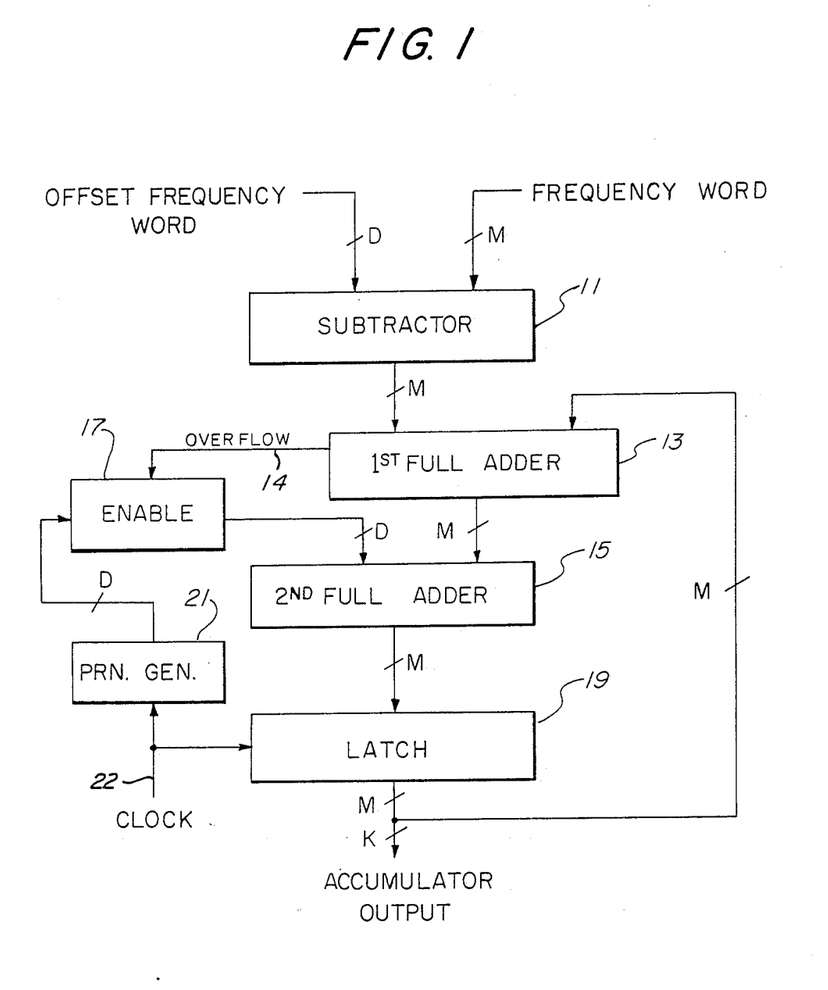
FIG. 1 is a block diagram of accumulator circuitry according to the preferred embodiment of the invention.

A dithered accumulator circuit according to the preferred embodiment is shown in FIG. 1. This circuit employs a subtractor 11 which receives an M-bit frequency word or "input vector" on a first input and subtracts from it a D-bit offset frequency word supplied on a second input. The output of the subtractor 11 is supplied as one input to a first full adder 13, which receives a second input from the output of a latch 19. The first full adder 13 outputs an M-bit word to one input of a second full adder 15 and an overflow bit to an enable gate 17. The second full adder 15 receives a second D-bit input from the enable gate 17 and outputs an M-bit output to the latch 19. The accumulator output comprises K bits where K≦M. A pseudorandom number (PRN) generator 21 provides a D-bit pseudorandom number to the enable gate 17. The pseudorandom number generator 21 and the latch 19 receive a clock input on a clock line 22. The accumulator may be viewed as an integrator which integrates phase increments, $\Delta\phi$, at its input, represented by the frequency control word, to yield an output K representing phase $\phi$.

In typical prior art DDS circuits, the accumulator consists of an adder and a latch, analogous to the first full adder 13 and the latch 19. The embodiment of the invention includes a second full adder 15, enable gate 17 and pseudorandom number generator 21. As will be appreciated, the second full adder 15 adds the pseudorandom number from the PRN generator 21 to the output of the first full adder 13. The pseudorandom number is added only when an overflow occurs from the first full adder 13. Such an overflow is signalled over a line 14 from the first full adder to the enable gate 17, which then gates the pseudorandom number to the second full adder 15. The pseudorandom number added to the output of the first full adder 13 is selected to satisfy the following equation:

$$f_m' >> \frac{\sqrt{3}}{2} f_{CLK} \left( \sum_{j=0}^{D-1} 2^{j-M} \right) \quad (1)$$

Where $f_m'$ is the frequency offset in the spur closest to the fundamental, $f_{CLK}$ is the clock frequency on line 22, which updates the latch 19 and clocks the number generator 21, D is the number of bits in the PRN generator 21 and in the offset frequency word, and M is the number of bits in the input vector. To satisfy this equation, the number of bits "D" in general must be very small compared to "M." If "D" becomes too large, the right-hand side of the equation becomes much greater than the offset in the frequency spectrum of the first spur, $f_m'$ and effectiveness in reducing close-in spurs is decreased.

When the pseudorandom number is added in by the second full adder 15, a slight frequency offset occurs. Depending on system specifications and the amount of dither added in, it may be unnecessary to compensate for this offset. In such case, the subtractor 11 is not required. For example, if only one or two bits are dithered, i.e., D<<M, it will cause a very small offset in the output frequency. It may be noted that the second full adder 15 can be placed elsewhere in the circuit, for example in the place of the subtractor 11.

Selection of the number of bits "D" to be very small satisfies the relationship of equation (1) and therefore results in the desired substantially flat frequency deviation density for suppression of close-in spurs. It is also possible to achieve such flat frequency deviation density by arranging the circuitry to decode certain conditions where worst case spurs occur and respond to such conditions to randomize the accumulator.

Figure 2:
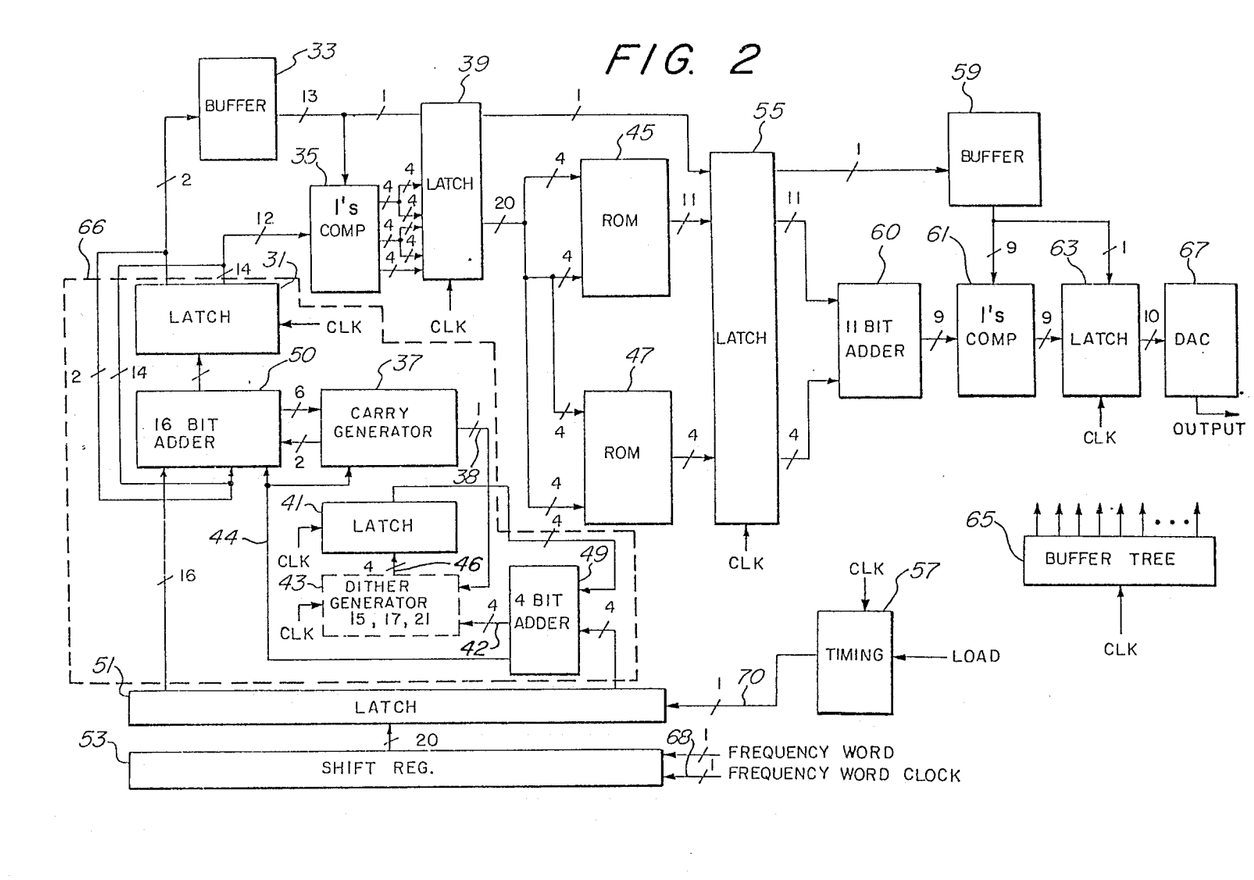
FIG. 2 is a circuit block diagram of a DDS circuit employing the preferred embodiment of the invention.

FIG. 2 illustrates the incorporation of the preferred embodiment into a pipelined DDS circuit. The circuitry within the dashed line 66 comprises the dithering circuitry 66 according to the invention, while the remaining circuitry comprises a typical sine look-up DDS. This embodiment employs an accumulator sectioned into stages in order to maintain throughput of the pipelined system.

The dithering circuitry 66 receives a frequency word which is shifted serially into a shift register 53 clocked by a clock on a line 68. In the illustration shown, a twenty-bit frequency word is used as an example. The twenty-bit frequency word is input in parallel to a latch 51. The latch 51 is activated by a control line when a strobe (LOAD), e.g., from a digital processor, is supplied to a clocked timing circuit 57, which synchronizes the edge of the load strobe with the DDS system clock (CLK). The four least significant bits of the output of the latch 51 are transmitted to one input of a four bit adder 49, while the other sixteen bits contained in the latch 51 are transmitted to one input of a sixteen bit adder 50. Six carry generate and propagate outputs of the sixteen bit adder 50 are outputted to a look ahead carry generator 37, which supplies an overflow bit on a line 38 to one input of a dither generator 43. The other input of the dither generator 43 is connected to receive the output 42 of the four bit adder 49 and has a four bit output 46 connected to a latch 41. The four bit output of the latch 41 is connected as the input to the four bit adder 49.

In the embodiment of the dither circuit 66 shown in FIG. 2, the four bit adder 49, sixteen bit adder 50 and look ahead carry generator 37 comprise the first full adder 13 of FIG. 1. Accordingly, the carry-out line 44 of the four bit adder 49 is connected to the carry-in input of the sixteen bit adder 50 and to the carry generator 37. The dither generator 43 includes the pseudorandom number generator 21, the enable gate 17 and the second full adder 15 illustrated in FIG. 1. Thus, the first full adder 13 of FIG. 1 is sectioned into two parts 49, 50, and the dithered accumulated value outputted by the dither generator 43 is latched into the latch 41 and then added into the four bit adder 49 for accumulation of the lower section of the accumulator represented by the part of the M bits from latch 19 which lead back to the input of the first full adder 13 of FIG. 1. The sixteen bit adder 50 outputs to a sixteen bit latch 31. This latch 31 and the latch 41 perform the function of the latch 19 in FIG. 1.

Those skilled in the art will recognize the circuitry of FIG. 2 outside of dashed line 66 as typical DDS circuitry employing a sine approximation technique and quadrant decoding method to generate addresses for a sine look-up table stored in read only memory (ROM) circuits 45, 47. The circuitry for configuring the addresses includes a buffer 33, exclusive-or gates 35 for performing the one's complement, and a latch 39. The twelve most significant bits of the latch 31 are supplied to the first input of the one's complement circuit 35. The output of the latch 31 is fed back to the second input of the sixteen bit adder 50. The two least significant bits are supplied as an input to the buffer 33, which provides a large fanout to thirteen bits. The twelve significant bits of the output of the buffer 33 form the second input into the comparator 35. The one's complement circuit 35 comprises an exclusive-or (EX-OR) of respective pairs of the twelve incoming bits on first and second input lines from the latch 31 and the buffer 33. The upper four bits of the output of the one's complement circuit 35 are supplied to the first four bit positions of a twenty bit latch 39 and to the second four bit positions of the latch 39. The second four bits output by the one's complement circuit 35 are supplied to the next four bit positions of the latch 39 and to the next four bit positions of the latch 39. The last four bits of the twenty bit latch 39 are filled by the last four bits output by the comparator circuit 35.

According to the quadrant decoding method, the twenty output bits of the latch 39 are connected to address the respective ROM's 45, 47. The two read-only memory circuits 45, 47, supply a fifteen bit output to the latch 55. The latch 55 further receives the most significant bit from the latch 39 and transfers that most significant bit, which is the sign bit, to a buffer 59. The outputs of the table look-up operation, respectively, eleven bits from ROM 45 and four bits from ROM 47, are added by an eleven-bit adder 60 which outputs nine bits to a one's complement circuit 61. The one's complement circuit 61 receives a nine bit input from the buffer 59, and outputs nine bits to a latch 63. Latch 63 also receives the sign bit from the buffer 59. The latch 63 supplies a ten bit digital output to a digital to analog converter 67. As those skilled in the art will recognize, the one's complement circuit 61 supplies the appropriate sign to the output since only one quadrant of the sinewave is stored in the read-only memory circuits 45, 47. A buffer tree timing generator 65 is also supplied to provide appropriate clock signals to the circuitry.

The desired output of the DDS is a sinusoidal signal; therefore, the closer the output approximates the sine-wave the better the output spectral purity will be. The digital approach of FIG. 2 is to use a sine look-up table in ROM which is addressed by the output of the accumulator 66. The ROM output is then input to a DAC for an approximation to the desired output sinewave. The accuracy of the approximated output will depend on the phase information contained in the accumulator, truncation in the sine algorithm and DAC, and other DAC errors.

The sine approximation technique used in the embodiment of FIG. 2 is unmodified from the DDS LSI design of Sunderland et al. Sunderland's DDS sine algorithm utilizes a well-known technique of ROM reduction by storing only one quadrant of the symmetrical sinewave in memory. In addition, his DDS design utilizes a unique trigonometric reduction to substantially reduce the memory requirements further. The arguxent of the sine function is separated into three terms, and the following trigonometric identity is applied:

$$\sin(A + B + C) = \sin(A + B)\cos C + \cos A \cos B \sin C - \sin A \sin B \sin C \quad (2)$$

Approximations are made, and the equation becomes $$\sin(A + B + C) = \sin(A + B) + \cos A \sin C \quad (3)$$

Compensation is added to the terms B and C to reduce the errors introduced by the approximation. The reader is referred to Sunderland et al., "CMOS/SOS Frequency Synthesizer LSI Circuit for Spread Spectrum Communications," IEEE Journal of Solid-State Circuits, Vol. SC-19, No. 4, August 1984, for further details of this approximation. The two terms on the Right Hand Side of equation (3) represent the separation of the ROM into the two parts shown in FIG. 2: a coarse ROM 45 (of size 256×11) and a fine ROM 47 (of size 256×4). The two terms are added together by the eleven bit adder 60 and combined with the sign bit for a twelve bit offset binary output to the DAC 67, which is truncated to ten bits in the embodiment shown. The one's complement circuit 35 preceding the ROM's 45, 47 decodes the quadrant, while the one's complement circuit 61 following the eleven bit adder 60 decodes the sign. The phase information propagates through the DDS from the accumulator latch 31, to the ROM latch 39, to the ROM latch 55, to the DAC latch 63 with each step, from latch to latch, representing a pipelined stage. Each stage must settle within a clock period, and the throughput is determined by the clock period, the number of pipelined stages, and the settling time of the DAC 67.

The twenty bit accumulator 66 of FIG. 2 is sectioned into a sixteen bit high accumulator 50 and four bit low accumulator 49. The carry of the low accumulator 49 into the LSB of the high accumulator 50 is truncated in the sine approximation algorithm and DAC 67: the twelve bits retained in the sine algorithm represents the truncation of the least significant four bits of the sixteen bit high accumulator 50. A DAC 67 with ten bits of resolution represents additional truncation. Therefore, the carry from the low accumulator 49 can lag behind the high accumulator 50 by one clock cycle without affecting the significance of the bits in the sine algorithm. Similarly, additional accumulator sections can be added to the accumulator.

Since the low accumulator 49 is parallel to the high accumulator 50 and requires only a four bit adder, the low accumulator 49 is an advantageous place to inject dither without decreasing the DDS throughput. A pseudorandom value can be added to the low accumulator 49 to inject dither at each overflow of the high accumulator 50. But the previous random number which Wheatley subtracted from the accumulator may require a borrow from the high accumulator. If the previous random number is not subtracted out, the average of the random value will offset the output frequency just as though this average value had been added to the frequency control word. Since the pseudorandom number generator has a known average value, it can simply be subtracted from the frequency control word. If the processor is not capable of this, a twenty bit subtractor is required. To avoid the twenty bit subtractor, the carry which is added to the high accumulator 50 can be effectively subtracted out later by removing a "1" from the LSB of the high accumulator register when such a condition occurs. Care must be taken not to subtract this bit out too soon, or the random phase values may not accumulate to the extent necessary to generate the carry into the significant bits which address the sine ROM's 45, 47.

The random value is added to the accumulator sum before the accumulator latch 41, but it can be added anywhere in the accumulator loop or at the input vector. It is assumed that the overflow from the low accumulator 49 would not affect more than the least significant bit of the high accumulator 50. If the input vector to the low accumulator 49 is not zero, the possibility of carries into the two least significant bits of the high accumulator 50 could be required in one check period. One way of avoiding this problem is to extend the accumulator, such that the lowest section of the accumulator 49, which is dithered, is lower in significance than the LSB of the input vector. The condition for the greatest spurs occurs when only a few of the MSBs are high and the LSBs of the accumulator are zero.

In order to determine the requirements for the random number generator 21, the DDS implementation must be considered. At exactly half the clock frequency, the alias will coincide with the output frequency. The alias occurs at the frequency determined by subtracting the output frequency from the clock frequency. The output frequency must be less than the alias by a margin necessary for the transition region of the output alias filter (a low pass filter to filter out the alias). Therefore, the random number generator 21 must have a propagation delay which is at most slightly less than twice the clock period at the highest possible DDS output frequency. A suitable random number generator is a design by Rader et al. disclosed in the article "A Fast Method of Generating Digital Random Numbers," The Bell System Technical Journal, November 1970. This design has a delay equal to the settling time of a flip-flop and the propagation delay of an exclusive-or gate. Rader lists the sequence period for register lengths from L=1 to 25. A longer sequence period represents a better pseudorandom number approximation to a true random number. Rader shows a period of 159783 for L=13, which requires a reasonable amount of hardware, and it has a good autocorrelation function of noise generation. The distribution is uniform, and any number of bits required (up to thirteen) for dithering can be selected from it to dither the accumulator of the DDS.

The DAC 67 is the final stage in the disclosed DDS. Following the DAC 67 is a filter for smoothing the output sinewave and reducing the alias amplitude (not shown in FIG. 2). The performance of the DAC 67 is of concern since the spurious performance of the DDS can be affected. The circuitry disclosed in FIG. 2 is all digital and can be implemented in Very High Speed Integrated circuit (VHSIC) technology with clock rates in the gigahertz. The DAC 67, however, must settle to within a specified accuracy to the desired level within one clock period. In addition, the spectral performance of the DDS is degraded by DAC errors.

At the state-of-the-art, Hewlett-Packard Laboratories has developed a twelve bit GaAs DAC capable of conversion rates of 1 gigaword/s. The packaging required for linearity performance at full speed requires microwave techniques. Such a design demonstrates the advancements being made in DAC technology and will certainly have application in advanced DDS designs. However, conversion rates of typical off-the-shelf ten bit DACs can range up to 100 megawords/s, which has proved satisfactory in simulations of the circuit of FIG. 2.

Figure 3:
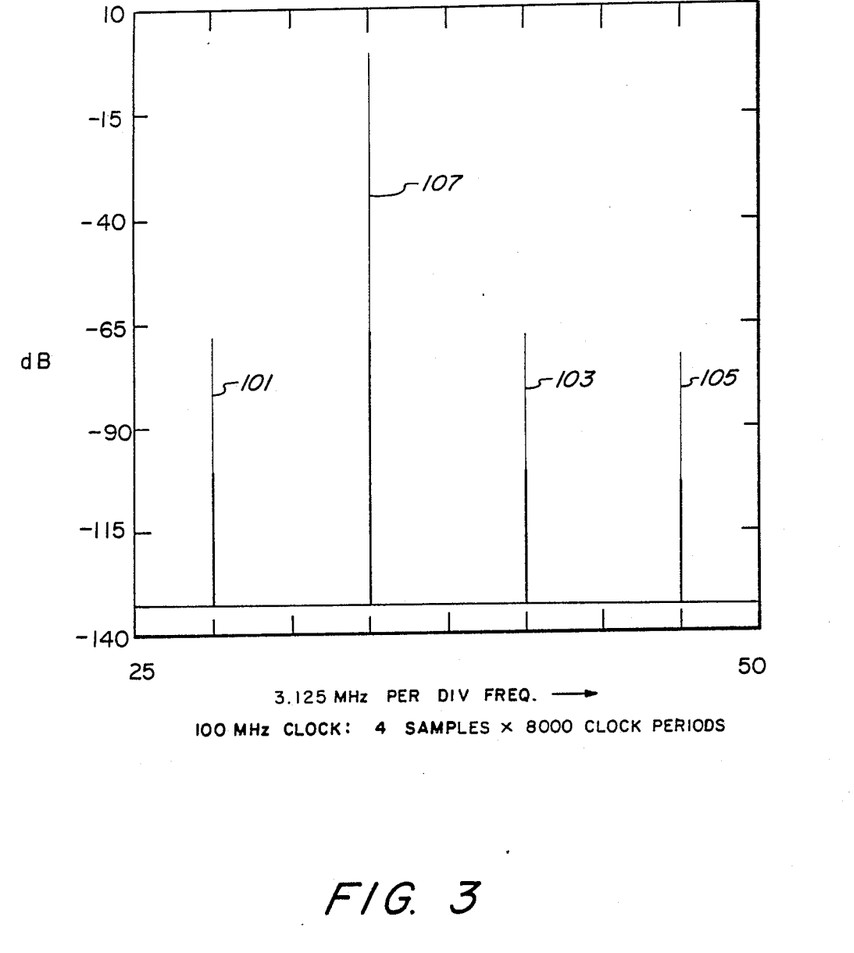
FIG. 3 illustrates spurs present about the fundamental in the output of an undithered accumulator.
Figure 4:
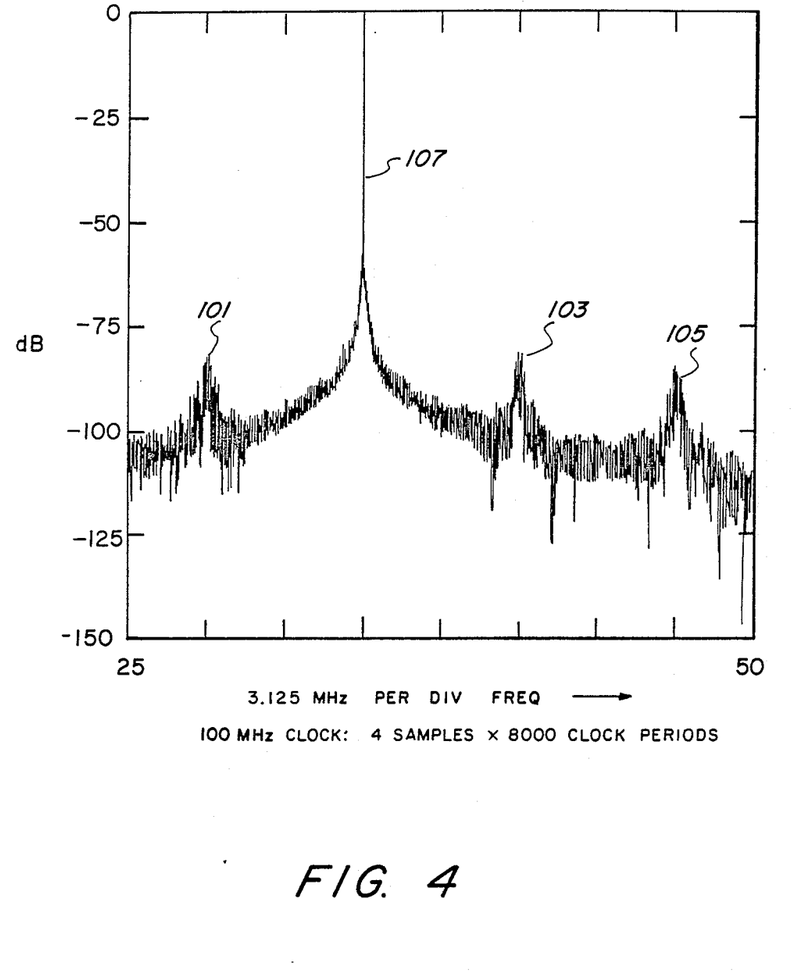
FIG. 4 illustrates suppression of spurs according to the preferred embodiment.

The operation of the preferred embodiment in suppressing spurs may be graphically illustrated using FIGS. 3 and 4. FIG. 3 shows spurs 101, 103, 105, typically present about the fundamental 107 in the output of a DDS with an undithered accumulator. The preferred embodiment functions to suppress the amplitude of such spurs 101, 103, 105 as shown in FIG. 4. Suppression of the close-in spurs 101, 103 is a particular advantage of the invention over the prior art. The spectrum of FIG. 4 exhibits decreasing phase noise with frequency offset from the output frequency and therefore has a substantially flat frequency deviation density and reduces all spurs including those close-in.

The foregoing discussion has illustrated a dithered accumulator circuit and its application to reduce spurs in the output of a DDS circuit. Those skilled in the art will appreciate that many adaptations and variations of the disclosed embodiments may be made without departing from the scope and spirit of the invention. Therefore, it is to be understood that, within the scope of the appended claims, the invention may be practiced other than as specifically described herein.

What is claimed is:

1. Direct digital frequency synthesis circuitry for use in synthesizing an output having a fundamental frequency from an input phase increment value comprising:

first adder means having first and second inputs and an output and receiving at least a portion of said phase increment value at said first input;
   storage means having an input and an output; and
   means connected to said first adder means and said storage means for producing a signal at said output of said storage means having said fundamental frequency and exhibiting a plurality of spurs located at frequencies spaced apart from said fundamental frequency on each side thereof and for causing said signal to exhibit substantially nonvarying frequency deviation density in the vicinity of said spurs wherein the parameter "frequency deviation density" represents the rms frequency deviation about a frequency $f_m$ measured at the output of an FM discriminator having a baseband filter 1-Hertz wide centered on the frequency $f_m$.

2. The circuitry of claim 1 wherein said means connected to said first adder means suppresses close-in spurs including those spurs on either side of said fundamental frequency and closest in frequency thereto.

3. The circuitry of claim 1 wherein said storage means comprises means for storing a binary word and updating said binary word in accordance with a selected clock rate, and said phase increment value comprises a binary frequency control word, and wherein said means connected to said first adder means includes: means for adding binary random or pseudorandom numbers to a selected few of the least significant bits of the output of said first adder means.

4. The circuitry of claim 3 wherein the number of bits in said random or pseudorandom numbers is selected to satisfy the equation:

$$f_m' >> \frac{3}{2} f_{CLK} \left( \sum_{j=0}^{D-1} 2^{j-M} \right) \quad (1)$$

where $f_m'$ is the frequency offset in the spur of frequency immediately adjacent the fundamental frequency, $f_{CLK}$ is the clock rate at which the output of said storage means is updated, D is the number of said selected few bits, and M is the number of bits in said binary word.

5. The circuitry of claim 3 wherein said means for adding comprises:
   a pseudorandom number generator means for generating a pseudorandom number; and
   second adder means for adding said pseudorandom number to a selected few bits of the output of said first adder means.

6. The circuitry of claim 5 wherein said storage means comprises a latch means having an input and an output and wherein the output of said second adder means is supplied to the input of said latch means.

7. The circuitry of claim 5 wherein said fundamental frequency is determined by said frequency control word and further including:
   subtraction means for generating said frequency control word by subtracting an offset from an input frequency word prior to supplying said frequency control word to said first adder means.

8. The circuitry of claim 3 wherein said first adder means is sectioned into a low order adder means having an output and a high order adder means having an output, each of said high and low order adder means having an input receiving a respective portion of said frequency control word.

9. The circuitry of claim 8 wherein said pseudorandom number is added to the respective portion of said frequency control word supplied to the input of said low order adder means by said means for adding.

10. A direct digital frequency synthesizer (DDS) for producing an output signal including a fundamental frequency and a plurality of spurs comprising:
    accumulator means for producing an accumulated output;
    means connected to said accumulator means for causing said output signal to exhibit nonvarying frequency deviation density in the vicinity of said spurs in said output signal, wherein the parameter "frequency deviation density" represents the rms frequency deviation about a frequency $f_m$ measured at the output of an FM discriminator having a baseband filter 1-Hertz wide centered on the frequency $f_m$; and
    sine approximation circuit means receiving the output of said accumulator means for converting said accumulated output to an analog output waveform.

11. The DDS of claim 10 wherein said accumulator means, means connected to said accumulator means and sine approximation circuit means are sectioned into pipelined stages.

12. The DDS of claim 10 wherein said accumulator means comprises a lower order accumulator means and a higher order accumulator means.

13. The DDS of claim 10 wherein said fundamental frequency is determined by a frequency control word and wherein said accumulator means sand means for causing said signal to exhibit nonvarying frequency deviation density comprise:
  a lower order accumulator means receiving a selected number of the lower order bits of said frequency control word and a second input and for generating and supplying a carry output and an accumulated output, said accumulated output comprising a first plurality of bits;
  dither generator means receiving said accumulated output and a carrying input for dithering a selected number of said first plurality of bits and supplying a dithered output as said second input to said lower order accumulator means; and
  a higher order accumulator means receiving a selected number of the higher order bits of said frequency control word and said carry output for generating the said output received by said sine approximation circuit means, for generating said carry input, and for supplying said carry input to said dither generator means.

14. The DDS circuit of claim 13 further including:
  input latch means for latching said frequency control word and supplying said lower order bits of said frequency control word to said lower order accumulator means and the remaining bits of said frequency control word to said higher order accumulator means.

15. The DDS of claim 14 where said sine approximation circuit means comprises:
  a first one's complement circuit means receiving the output of said output latch means;
  address latch means for latching the output of said first one's complement circuit means and supplying an output;
  storage means addressed by the output of said address latch means;
  storage output latch means for latching the output of said storage means and supplying an output;
  adder means receiving the output of said storage output latch means and providing an output;
  a second one's complement circuit means receiving the output of said adder means and supplying an output;
  second output latch means for latching the output of said second one's complement circuit means; and
  digital to analog conversion means supplied with the output of said second output latch means for converting the output of said second output latch means to an analog waveform.

16. The DDS of claim 15 further including clock means for sequentially clocking each latch means to achieve pipelined propagation of phase information through said DDS circuit.

17. Direct digital frequency synthesis circuitry for use in synthesizing an output from an input phase increment value, said output having a fundamental frequency and spurs disposed adjacent said fundamental frequency comprising:
  first adder means having first and second inputs for receiving at least a portion of said phase increment value at said first input and for generating a sum output and an overflow output;
  storage means having an input and an output connected to one of said first and second inputs of said first adder means;
  a second adder means having first and second inputs and an output, said first input of said second adder means being connected to receive the sum output of said first adder means, the output of said second adder means being connected to the input of said storage means;
  a pseudorandom number generator means for generating and outputting a pseudorandom number; and
  an enable gate means receiving said pseudorandom number from said generator means and said overflow output from said first adder means for supplying said pseudorandom number to the second input of said second adder means in response to generation of a said overflow output.

18. The circuitry of claim 17 wherein said storage means comprises means for storing a binary word and updating said binary word in accordance with a selected clock rate, wherein said phase increment value comprises a binary frequency control word, wherein said pseudorandom number comprises a binary pseudorandom number, and wherein said first adder means further comprises:
  means for adding said binary pseudorandom number to a selected few of the least significant bits of said phase increment value.

19. The circuitry of claim 18 wherein the number of bits in said binary pseudorandom number is selected to satisfy the equation:

$$f_m' >> \frac{3}{2} f_{CLK} \left( \sum_{j=0}^{D-1} 2^{j-M} \right) \quad (1)$$

where $f_m'$ is the frequency offset in the spur immediately adjacent the fundamental frequency, $f_{CLK}$ is the clock rate at which the output of said storage means is updated, D is the number of said selected few bits, and M is the number of bits in said binary frequency control word.

20. Direct digital frequency synthesizing circuitry for use in generating an output to be received by a sine approximation circuit means and containing a fundamental frequency wherein said fundamental frequency is determined by a frequency control word, comprising:
  a lower order accumulator means receiving a selected number of the lower order bits of said frequency control word and a second input and supplying an accumulated output comprising a plurality of bits and a carry output;
  dither generator means receiving said plurality of bits and a carry input for dithering a selected number of said plurality of bits and supplying a dithered output as said second input to said lower order accumulator means; and
  a higher order accumulator means receiving a selected number of the higher order bits of said frequency control word and said carry output for generating said carry input and the said output received by said sine approximation circuit means and and for supplying said carry input to said dither generator means.

21. The circuitry of claim 20 wherein said circuitry produces an output signal including spurs at frequencies immediately adjacent said fundamental frequency and wherein said selected few bits are selected to satisfy the equation:

$$f_m' >> \frac{\sqrt{3}}{2} f_{CLK} \left( \sum_{j=0}^{D-1} 2^{j-M} \right) \quad (1)$$

where $f_m'$ is the frequency offset in the spur immediately adjacent the fundamental frequency, $f_{CLK}$ is the clock rate at which the contents of said lower order accumulator means is updated, D is the number of said selected few bits, and M is the number of bits in said binary word.

* * * * *